United States Patent [19]

Galvagni et al.

[11] Patent Number: 4,862,318
[45] Date of Patent: Aug. 29, 1989

[54] METHOD OF FORMING THIN FILM TERMINATIONS OF LOW INDUCTANCE CERAMIC CAPACITORS AND RESULTANT ARTICLE

[75] Inventors: John Galvagni, Myrtle Beach, S.C.; James M. Oberschmidt, Stanfordville; James N. Humenik, LeGrangeville, both of N.Y.

[73] Assignees: AVX Corporation, Great Neck; IBM Corporation, Armonk, both of N.Y.

[21] Appl. No.: 332,993

[22] Filed: Apr. 4, 1989

[51] Int. Cl.⁴ .................... H01G 1/01; H01G 3/06; H05K 1/04
[52] U.S. Cl. .................... 361/321; 29/25.42; 361/411
[58] Field of Search ............... 361/328, 329, 330, 308, 361/309, 310, 321, 411, 306; 174/68.5; 29/25.42

[56] References Cited

U.S. PATENT DOCUMENTS

| | | | |
|---|---|---|---|
| 3,508,118 | 4/1970 | Merrin et al. | 361/411 X |
| 3,621,442 | 11/1971 | Racht et al. | 361/411 X |
| 3,872,356 | 3/1975 | Kruger et al. | 361/411 X |
| 4,430,690 | 2/1984 | Chance et al. | 361/321 |
| 4,661,192 | 4/1987 | McShane | 361/411 X |

*Primary Examiner*—Donald A. Griffin
*Attorney, Agent, or Firm*—Arthur B. Colvin

[57] ABSTRACT

An improved method for forming shorting bars on ceramic capacitors of the tab type includes the step of effecting a final polishing of the tab exposed surface utilizing grit or abrasives of a critical size, namely of average particle size in the range of about 2 to about 10 microns. The method further employs thin film metallurgy namely the vacuum deposition or sputtering of one or more layers within specified thickness ranges. There is further disclosed an improved capacitor fabricated in accordance with the method described.

8 Claims, 2 Drawing Sheets

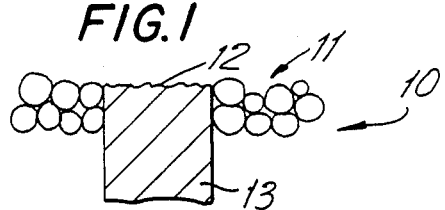
FIG. 1
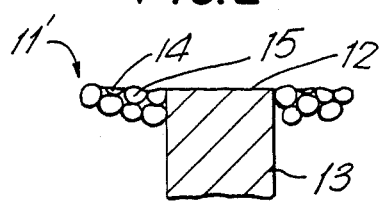
FIG. 2
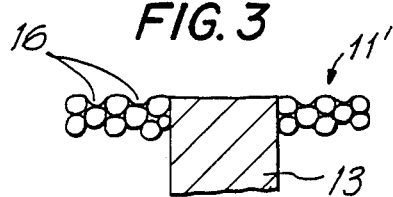
FIG. 3
FIG. 4
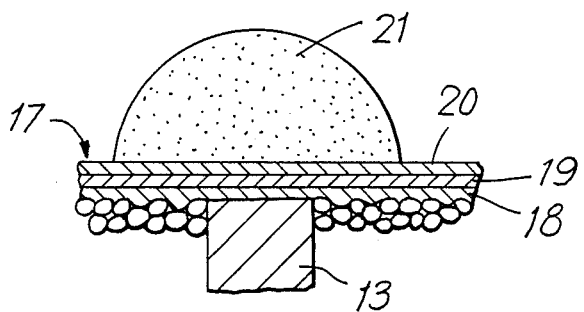

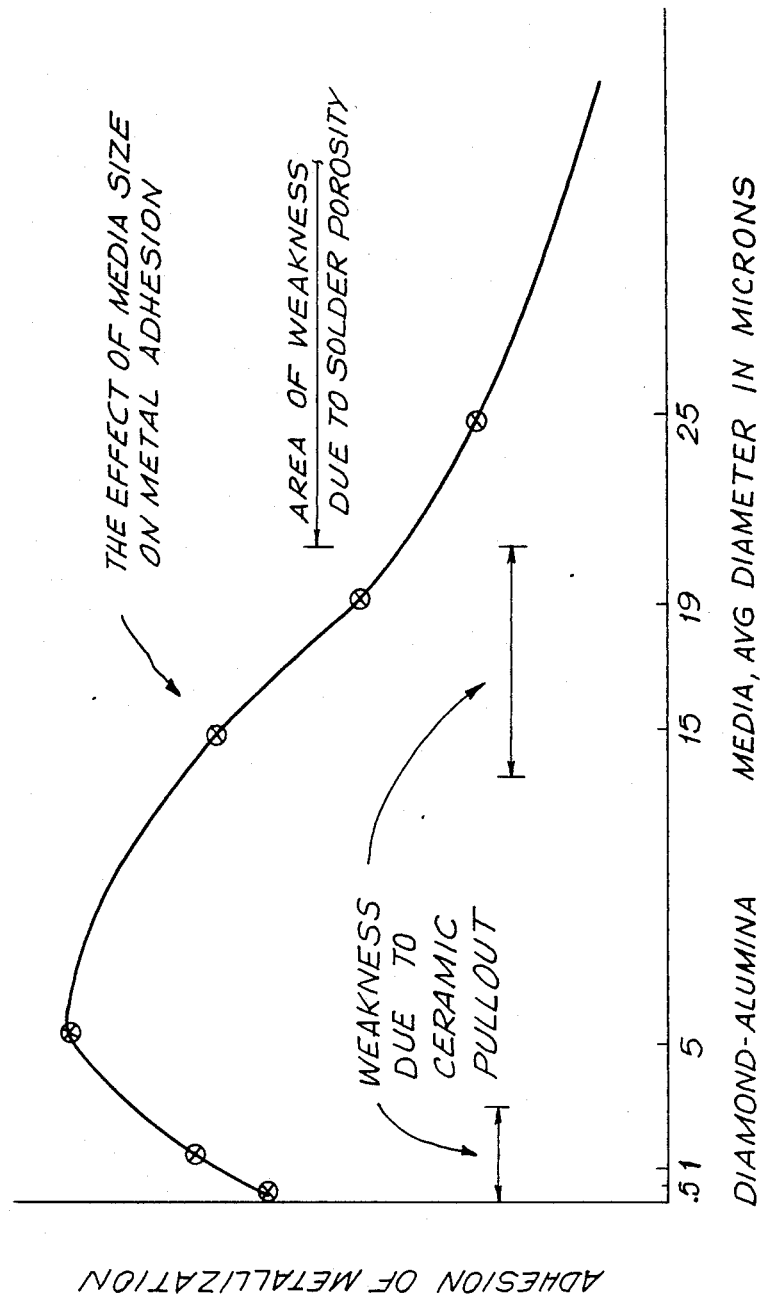

METHOD OF FORMING THIN FILM TERMINATIONS OF LOW INDUCTANCE CERAMIC CAPACITORS AND RESULTANT ARTICLE

BACKGROUND OF THE INVENTION

The present invention is directed to a method of forming thin film terminations on low inductance ceramic capacitors and the like and to the resultant products.

THE PRIOR ART

Multi-layer ceramic capacitors (MLC) are extensively employed in computer application, particularly as a means for damping error causing voltage spikes in the power supplies of IC devices. It is known that the damping efficiency of a capacitor is significantly increased where the inductance of the capacitor is minimized and where the length of the leads linking the capacitor to the IC device is also minimized.

Conventional MLC's which are terminated at opposed end portions have been found to exhibit relatively high inductance, and have necessitated the use of relatively long leads running from the capacitor terminals to the IC devices, further increasing the inductance of the circuitry.

In order to minimize inductance and reduce the connective paths between capacitor and remaining circuitry, an improved form of MLC, known in the industry as a "tab" capacitor has been developed. In the tab capacitor, a representative example of which is disclosed in U.S. Pat. No. 4,328,530 of May 4, 1982, the capacitor electrodes include connecting tabs all of which emerge at a single surface of the capacitor. The tabs connected to electrodes of like polarity are electrically joined by shorting bars on the capacitor surface which shorting bars may connect selected numbers of the electrodes so that a single stock capacitor may be adjusted as to capacitance in accordance with the number of tabs contacted by the shorting bars.

In order to minimize inductance between the tab capacitor and its associated electronic components connection has been effected utilizing ball limiting metallurgy (BLM) techniques. In accordance with BLM technology solder balls are applied to the shorting bars in selected patterns. The capacitor is applied to the associated electronic device by placing the solder balls against the device which has been provided with a "footprint" matching the spacing of the solder balls and thereafter heating at the interface to bond the solder balls to the conductive paths of the associated component.

Capacitor terminations have typically been effected by thick film technologies. Thick film terminations require that pastes containing conductive particles be accurately painted or screened over the capacitor electrodes to be connected. The paste typically includes metallic particles and low melt glass frit, and after application, the capacitor must be heated to sinter the frit and effect contact between the metal components of the paste and the exposed portions of the capacitor electrodes. While thick film terminations are effective with conventional (end terminated) capacitors, due to such factors as size, difficulty of application, and fragility, thick film termination techniques have not been found commercially viable with tab type ceramic capacitors.

Numerous methods have been proposed for the termination of tab type ceramic capacitors for use in conjunction with BLM capacitor affixation technology. Such methods have included formation of solder bars by embossing slots into the green ceramic between tab rows, plating or vapor metallization of the entire tab containing surface subsequent sawing to isolate selected groups of tabs, and vapor deposition in registry with tabs to define the required shorting bars.

None of the noted techniques as heretofore practiced has proven to constitute a satisfactory solution to the termination of tab type capacitors. Thus, while vapor deposition (such term to include sputtering, and various vacuum metalizing techniques) represent known procedures suitable, for example, for depositing thin films on silicon wafers and the like through masks, such techniques while previously suggested for use on a ceramic surface have not provided an idealized shorting bar for receiving the solder balls employed in BLM technology.

The shorting bar of a tab type capacitor must exhibit a number of properties in order to be effective. The bar must adhere strongly to the capacitor body, exhibit thermal stability, not peel from the capacitor when subjected to heat, must be highly conductive, must be corrosion resistant, must be non-wettable by the solder, must resist migration of the underlying metals of the electrode tabs, and must provide a strong adhesion of solder balls to the shorting bar.

Conventional thin film application techniques (vapor deposition) have not provided the ability to form an idealized shorting bar having all of the above characteristics.

Prior art references relevant to various phases of capacitor formation, electrode formation, BLM technology, metallizing technology, and tab capacitor constructions are noted below.

IBM Technical Bulletin item 26 number 12 of May 1984 (page 6595) and IBM Technical Bulletin V-26 number 10B of March 1984 (page 5684) are relevant in their showing of tab capacitors and solder ball mounting techniques.

IBM Technical Bulletin Volume 24 number 1B of June 1981 (page 437 and following) relates to a bottom terminated capacitor wherein the lower surface is lapped to make the same suitable for thin film processing. The reference recites generally the application of a dielectric layer which is etched through and wherein via metal is applied "most likely by" vapor deposition. Shorting bars are thereafter applied followed by application of solder balls. Pat. No. 4,328,530 relates to a tab capacitor which includes layers said to be applied by plating or evaporation techniques.

Pat. No. 4,430,690 discloses a low inductance tab type capacitor utilizing solder bar terminations formed by embossing slots into the green ceramic. The bars are said to be formed by evaporating metal into the slots and evaporating solder onto portions of the bars.

Pat. No. 4,419,714 discloses a low inductance tab capacitor formed by metallizing a layer which covers all of the tabs exposed on a surface and selectively sawing through the metal to isolate areas of the metallizing layer. Thereafter, non-solder wetting dams are applied in surrounding relation of the remaining metallized components.

IBM Technical Disclosure Volume 25 number 4 of September 1982 (page 1902 and following) discloses a low inductance tab type capacitor and suggests the use of thin or thick film techniques to form shorting bars.

IBM Technical Disclosure Bulletin Volume 25 number 4 of September 1982 (page 1907) suggests the use of surrogate alignment tabs on the surface opposite the electrode tabs to facilitate alignment of capacitors for locating the same for masking and positioning for future processing steps.

IBM Technical Disclosure Volume 26 number 3A of August 1983 (page 1084 and following) discloses a low inductance tab type capacitor utilizing thin film metallization techniques. The capacitors are said to be placed in a bakelite matrix for location in respect of future processing steps.

Pat. No. 4,439,813 discloses a decoupling capacitor for mounting on an IC multi-circuit ceramic. The capacitor is formed by evaporating or sputtering an electrode onto a carrier followed by deposition of a high dielectric layer, a further electrode deposition, and a top isolating layer. Holes are etched into the respective electrode layers and metal and solder balls thereafter deposited.

In a publication entitled SOLID STATE TECHNOLOGY of June 1983 (pages 91 through 97) there is discussed the advantages of using solder balls to join various chips to substrates. In a different article appearing in the same publication at pages 119 through 126 there is described the concept of utilizing layers of vapor deposited metals for decorative and conductive purposes. This article describes the concept of utilizing a tungsten and titanium alloy which is vapor deposited to form a barrier to prevent migration between metals of various types. The article describes the use of the tungsten and titanium as a barrier between a platinum contact exiting a silicon wafer and an aluminum layer.

An article in a publication entitled IBM JOURNAL OF RECENT DEVELOPMENTS dated May of 1969 (pages 226 through 238) discloses the application of aluminum strips to a silicon substrate and the use of plated copper balls seated in metallized vias as a means to mount the resultant device. The article also discusses the controlled collapse of solder balls surrounded by non-wetting areas.

Experimental attempts carried out by the inventors hereof to form by conventional metallizing means (sputtering and vacuum deposition) shorting bars on ceramic tab type capacitors have uniformally resulted in the formation of capacitors deficient in one or more particulars. Specifically, attempts to form shorting bars suitable for the mounting of solder balls by techniques as described at page 119 to 126 of the SOLID STATE TECHNOLOGY article referred to above have resulted in the formation of capacitors deficient in one or more of the respects noted below.

Deposition of tungsten and titanium alloys followed by formation of a superposed aluminum layer directly upon the ceramic in the as-sintered condition resulted in the production of shorting bars which, while strongly adherent to the ceramic, exhibit unacceptably high ohmic resistance across the length of a shorting bar. We have theoretically explained the high resistance by the fact that the relatively rough or rugous surface of the ceramic results in the formation of a metal film which is unduly elongated due to its following the peaks and valleys of the ceramic substrate. Moreover, solder balls deposited on the aluminum layer or upon a further covering layer exhibited a tendency to fracture and become readily disengaged from the surface of the deposited shorting bar.

Attempts to polish or lap the surface of the ceramic prior to forming a metallized shorting bar have engendered still other problems. If the composite metal shorting bar exceeds an optimum total thickness, the bar may exhibit suitable adhesion to the ceramic and suitably low ohmic resistance, but rapidly separates from the ceramic when the device is subjected to temperatures in the order of those experienced when the solder balls are remelted for attachment to a complimental substrate. Presumably, the separation is engendered by differential thermal expansion of the shorting bar and ceramic.

If the ceramic contacting layer of the composite shorting bar is formed of insufficient thickness, metal migration through such layer to the aluminum conductive layer is experienced.

After much experimentation, we have arrived at a range of optimal thicknesses of the respective metallizing layers as hereinafter disclosed. Such composite layer exhibits the desired conductivity, non-wettability, and necessary stretchability to be resistant to dislodgement when the device is subjected to thermal gradients. However, even such optimal vacuum deposited metallization sequence was found to be insufficiently mechanically bonded to the surface of the ceramic to resist peeling of the shorting bar from the capacitor surface when the capacitor is subjected to the stresses encountered during handling and application to IC devices and the like.

SUMMARY OF THE INVENTION

The present invention may be summarized as directed to the surprising discovery that a metallized shorting bar having all of the characteristics necessary and desirable for use as the medium for supporting solder balls for reflow connection of a capacitor or the like to an associated electronic component may be formed by subjecting the ceramic surface prior to metallization to a final abrading or polishing step utilizing a polishing medium having an average particle size of from about 2 microns to about 10 microns. More particularly, we have made the surprising discovery that there is a unique relationship between the particle size of the polishing medium used in the final polishing step on a ceramic surface and the suitability of such surface to support a shorting bar useful as the recipient of so called C-4 solder balls as conventionally employed in BLM technology applications.

As previously noted, we have discovered that shorting bars connecting the tabs of a ceramic capacitor should be formed by metals having certain specific characteristics, and must be formed in thicknesses within predetermined ranges. We have discovered, for example, that if an initial barrier layer is too thin (i.e. below about 2000 angstrom) it will not fulfill the desired isolation against migration. If the totality of thickness of the initial barrier layer is too great, unduly high ohmic resistance is encountered. The composite shorting bar must be sufficiently thin to be flexible so as not to become dislodged due to differential thermal expansion effects. We have discovered that a suitable shorting bar may be formed by vapor depositing a barrier layer of thickness of from about 2000 to 4000 angstroms, a conductive layer of from about 6000, to about 12,000 angstroms, and a final covering or passivating layer of about 2000 to 4000 angstroms thickness. Such a shorting bar exhibits all characteristics necessary for use in conjunction with BLM technology.

Still more particularly, we have discovered that a shorting bar as described can be satisfactorily deposited on a ceramic substrate and used with conventional BLM technology if, but only if, the ceramic surface has been subjected to a final abrading utilizing particles in the size range noted. Reference to particle size is intended to refer to the average size of the particles employed which may vary by about 50% in a given batch. Thus, reference to a grit size of 5 microns, for example, is intended to connote a polishing compound the average size of which is about 5 microns but wherein portions above and below this figure are present. The polishing step may be carried out utilizing any of a number of known polishing procedures including specifically a preferred polishing method wherein particles are carried in a liquid suspension which is mechanically wiped across the surface of the capacitors to be treated. Alternate polishing procedures such as air-blasting, and ultrasonic treatments are likewise suitable so long as they are used in conjunction with particles within the size range noted.

Attempts to follow the same polishing procedures using particles smaller than about 2 microns have been found to result in the formation of a conductive shorting bar which readily separates from the surface of the ceramic. The use of a final polishing step employing particles of a size larger than about 10 microns but under 20 micron likewise results in a shorting bar which readily separates from the ceramic surface. A final polishing step utilizing polishing particles in excess of about 20 microns results in the production of a shorting bar which while strongly adherent to the ceramic surface, induces a porosity in the solder balls themselves and at the interface between solder ball and shorting bar which renders the solder balls subject to fracture when the capacitor is subsequently attached to an associated electronic device.

From an examination of the ceramic substrate and undersurface of deposited metallic shorting bars following destructive testing in the nature of a mechanical force applied to the solder ball in a direction normal to the surface of the ceramic, we have theorized that the criticality of final polishing grit size is a function of the nature of ceramic compositions which are comprised of a multiplicity of interconnected grains bonded to each other at adjacent grain boundaries. More specifically, the surface of the ceramic, after polishing, is comprised of a generally flat planar mass, portions of which are defined by partial grains the boundaries of which are only lightly connected to adjacent grains. Other portions of the surface are define by central masses of adjacent grains. By the use of a final polishing step employing particles of the critical range described it is theorized that the partial and weakly adherent grains on the surfaces of the ceramic are removed leaving only the larger exposed surfaces of grains which are strongly adherent to the surfaces of adjacent grains. In other words the use of particles within the size limitations noted provides a relatively flat or slightly pitted surface substantially free of small partial grain increments. The use of a polishing material of a size smaller than about 2 microns, while leaving a surface which is smoother than that obtained by using particles within the critical size range is, in accordance with our theory, ineffective to remove the small partial grains due to the lower mass of such finishing material.

The use of polishing materials in the range of above 10 microns but below about 20 microns, it is theorized, results in the production of a surface wherein the partial grains remain, presumably because the size of the abrading particles far exceed the size of the partial grains which are themselves in the area of about 1 to 3 microns in depth and diameter and hence cannot engage and dislodge the partial grains.

We have further discovered that the use of final abrading techniques employing particles whose average size is larger than about 20 microns permits the formation of a strongly adherent metallic shorting bar, the strong adherence being theoretically due to the relatively rough surface left as a result of the abrading procedure. However, a shorting bar deposited on such rougher surface can not be employed in BLM metallurgy techniques since the solder balls themselves, upon subjection to reflow heating to join the same to an associate electronic device become porous and frangible exhibiting a high failure rate. We have theorized that the high failure rate of solder balls deposited over a shorting bar which has been formed over a ceramic surface finally abraded with particles of a size in excess of about 20 microns is occasioned by the fact that air is entrapped at the interface between the solder ball and the rough surface of the shorting bar. Since it must be recalled that a necessary characteristic of the uppermost layer of the shorting bar is that the bar be non-wettable by the solder, the presence in such interface will necessarily weaken the connection of the solder ball to the shorting bar or upon remelting of the solder introduced the entrapped air into the matrix of the molten solder producing a porous structure in the solder ball itself.

It should be recognized that the above theoretical explanations are to be viewed in a non-limiting sense representing merely an attempt to explain the surprising criticality of the polishing particle size ranges. Accordingly we are not to be bound by the accuracy of the theoretical explanation propounded above.

It is accordingly an object of the invention to provide a method of forming on a surface of a ceramic tab capacitor a shorting bar suitable for use with conventional BLM technology.

Still a further object of the invention is the provision of a tab type low inductance ceramic capacitor fabricated in accordance with the method of the instant invention.

BRIEF DESCRIPTION OF THE DRAWINGS

FIG. 1 is a fragmentary diagrammatic vertical sectional view through a portion of a ceramic capacitor the section extending through an electrode connected tab thereof.

FIG. 2 is a view similar to FIG. 1 after an initial polishing step.

FIG. 3 is a view similar to FIGS. 1 and 2 following a final polishing step in accordance with the invention.

FIG. 4 is a view similar to FIGS. 1 through 3 after the surface of the capacitor has been metallized and a solder ball affixed to the metallized shorting bar.

FIG. 5 is a graph comparing the size of the final abrading particles in relation to adherence of the shorting bar and or solder ball to the ceramic substrate.

DETAILED DESCRIPTION OF THE DRAWINGS AND INVENTION

Referring now to the drawings there is shown in FIG. 1 through 4 a surface of a low inductance tab type ceramic capacitor at various stages in the manufacture thereof. As will be readily recognized the views are diagrammatic in nature. FIG. 1 illustrates an increment 10 of a ceramic capacitor body which increment includes an upper surface 11 at which surface is exposed the upper most surface 12 of metallic tab 13 connected to an internal capacitor electrode (not shown). As will be apparent, and as will be evident from an electron micro photograph of the upper surface, the same is comprised of a sequence of peaks and valleys forming the grain boundaries of the upper most surface. The capacitor as illustrated in FIG. 1 is intended to represent the as formed conformation thereof which, as is known in the art, includes tool marks and various other irregularities in addition to the irregular grain structure noted.

FIG. 2 represent the capacitor of FIG. 1 which has been subjected to an initial polishing or lapping procedure as will be described in detail hereinafter. As will be evident from FIG. 2 the initial or rough polishing step to which the surface 11' of FIG. 1 has been subjected will be smoother than the as formed surface due to removal of approximately 1 to 2 mils of the capacitor surface thus removing such gross irregularities as tool marks, etc. As will be observed from FIG. 2 the rough polishing step leaves a new upper most surface 11' a significant portion of which is defined by partial grains such as grains 14 which are connected to adjacent generally complete grains 15 at irregular points about the interface between the grain boundaries.

FIG. 3 represents the appearance of the surface 11' of the capacitor of FIG. 2 after the same has been treated by the final and critical polishing step to be described in detail hereinafter. As will be appreciated by comparing FIGS. 2 and 3 the polishing step of the instant invention has removed the partial grains 14 leaving a series of pits 16, for example which, in practice are approximately 1 or 2 microns in depth. Some experimentation as to optimum grit size for the final polishing step may be desirable since, within the ranges noted there appears to be some correlation between optimum grit size and grain size of the ceramic.

FIG. 4 is a diagrammatic representation of a segment of the shorting bar 17 comprised of successive layers 18, 19 and 20 to the uppermost of which have been applied in accordance with conventional practice a solder ball 21. In accordance with the illustrated embodiment, a preferred shorting bar 17 may be comprised of a lower most or surface adjacent layer 18 which defines a barrier against migration of the metal (normally platinum or palladium) of tab 13, a central highly conductive layer 19, and a passivating upper layer 20. Details of the preferred compositions of the various layers as well as details of the various processing steps are set forth hereinafter.

FIG. 5 is a graph illustrating the relationship between the grit size used in the final abrading step and the resistance of the shorting bar structure and/or solder balls of the capacitor to dislodgement from the capacitor. At the low end of the grit size, i.e. below one or two microns, the separation occurs as a result of poor adhesion of the shorting bar to the ceramic substrate. At the high end (about 12 to about 20 microns) separation is also due to poor adhesion of shorting bar to ceramic. Above about 20 microns, the separation resulted from weakness within the solder balls or between the solder balls and shorting bar which weakness is considered to result from air inclusions.

DETAILED DESCRIPTION OF PROCESS

There follows hereinafter a detailed description of a preferred embodiment of the process which is herein incorporated for purposes of compliance with the "best mode" provisions of the patent laws. It should readily recognized that details of the ensuing description are subject to significant variation and thus the invention hereof is to be considered non-critical except to the extent defined in the appended claims.

As used herein the term "ceramic" is intended to refer to a sintered thick film dielectric matrix comprised of interconnected grains, illustratively Barum Titanate, etc. and having a high dielectric constant; about 1000 or greater. The process has been found to be largely independent of the specific ceramic formulations employed.

EXAMPLE I

A batch comprised of approximately 1000 ceramic capacitors was provided. The capacitors were dimensioned essentially as follows: 0.10 inches long 0.08" wide, 0.05" thick. The capacitors on their upper surface included 9 rows of tabs connected to the internal capacitor plates, there being 4–8 tabs in each row. The capacitors were fabricated of an essentially conventional formulation of barium titanate, dielectric.

STEP 1: MOUNTING THE CAPACITORS TO POLISH PLATE

The lower surfaces of the capacitors were glued to a plate dimensioned 10 inches diameter × 1 inch thick by a conventional bonding agent, illustratively "Superglue". (Brand name for cyanoacrylate adhesives). The upper surfaces of the capacitors were generally irregular or rough, having peaks and valleys having 1–2 mils of variation.

STEP 2: INITIAL (rough) SANDING

The capacitors were initially treated by a leveling-smoothing process as follows. An abrasive paper disk was applied to a platen of 16" diameter, and rotated at 100 RPM, with water flowing on the paper. The instrument used to accomplish this is a Buehler "Maximet" grinder-polisher. The abrasive component of the disk comprised a grit of 400 (average frit size: 37 microns). The rotating platen was brought into contact with the exposed surfaces of the capacitors supported on the disk under a head pressure of about 10 lbs. for a total period of 2 minutes, changing to fresh paper after 1 minute.

STEP 3: SECONDARY, SMOOTHER ABRASION

Thereafter, the process was repeated using on the rotating platen an abrasive paper of 600 grit (size: 25 microns) for a period of 30 seconds. The process noted removed about 2 mils of thickness from the capacitors leaving a surface which, while smooth to the naked eye, under magnification exhibited surface irregularities or roughness of about a depth of 5–10 microns.

STEP 4: TERITARY STEP, SURFACE TREATMENT

The surface of the rotating platen is thereafter covered with a felt cloth material of approximately 0.050" thickness, the felt being saturated with a suspension of grit of 5 micron average size in an aqueous medium. The platen was rotated against the exposed upper surfaces for 2 minutes, under a pressure of 10 lbs. Grits comprised of alumina, diamond or silicon carbide may be suitably employed without appreciably varying the procedure or result.

STEP 5: DE-MOUNT AND CLEAN

The capacitors are de-mounted from the plate by immersion in acetone. After the parts have "dropped" from the fixture, into a soft screen to protect them, they are rinsed twice more in clean acetone, at which point they are dried. It has been found that subjecting the parts to a temperature in excess of 300° C., but less than 1000° C., aids in removing any residual organic contaminants.

STEP 6: FIXTURE AND MASK FOR METALLIZATION

Then the parts are fixtured in an array, such that the prepared, (polished) surfaces are exposed, at which point, they are covered with a "metallization" mask. In that mask, nine slits are located at each position coincident with the nine rows of tabs, for each of the capacitors in the array. The slits are typically five mils wide and 75 mils longs.

STEP 7: SPUTTERING OF FIRST Ti-W (BARRIER) LAYER

The array, usually, with others, is then metallized using techniques well known in the art. For example, in one process, the array is placed in a sputtering machine, which consists of a vacuum chamber, a "target", which supplied the metal to be deposited, in this case a titanium-tungsten alloy, (usually 90% tungsten). A vacuum is drawn on the system, and a small amount of an inert gas, usually argon, is bled into the chamber. A residual pressure of about 40 milli-torr is maintained. Then., the argon gas is excited by imposition of a high DC field, (sometimes helped by a RF field as well). The "Power level" is set to about 4 KW, and the array(s) caused to glide under the "target" and to the other side, at a lineal speed of about 4 inches/minute. This rate, and power is adjusted to yield about 3000 angstroms of metal.

It has been found beneficial to preceed this deposition step with an "RF etch", which is accomplished in the same chamber. This amounts to a "plasma" being excited by an RF filed, such that argon atoms bombard the array, and the exposed surface of the ceramic, cleaning it by "knocking-off" impurities and residual gases. The parameters for this step are between 5 and 15 minutes with about 1 KW power setting.

STEP 8: EVAPORATION OF ALUMINUM CONDUCTOR LAYER

The capacitors are thereafter placed in an "E-Beam" evaporator, wherein a vacuum is drawn, usually about $10^{-6}$ torr. The array-fixture is located near the top of the chamber, with the surface to be metallized facing the "evaporation cup" into which has been placed aluminum. The e-Beam is turned on, causing the aluminum to heat to the point of evaporation. The emission current is adjusted to give an evaporation rate of 10-15 angstroms/sec. After about 10,000 angstroms has been deposited, the evaporation is turned off by interposing a shutter between the cup and target. The E-beam is turned off, the system allowed to cool, then the vacuum is released, and the chamber opened.

STEP 9: SPUTTERING OF 2ND (COVER) Ti-W LAYER

The final step in the "stripe-metallization" is the repetition of the "Ti-W" sputtering, (Step 7) to effect a "sandwich" of metals.

STEP 10: EVAPORATION OF THREE-LAYER BLM PAD

Steps 10 through 12 which represent essentially conventional BLM metallurgy are described herein but per se form no part of the instant invention. Accordingly, the hereinafter described layers intervening between the illustrated shorting bar comprised of layers 18, 19, and 20, and the solder ball 21 are not shown in the drawings.

The stripe mask is removed, and a different mask is substituted for it. That mask consists of an arrangement of 4 mil holes, arranged such that they coincide with the stripes. The mask is visually aligned to assure centering of the holes over the stripes, and the array-fixture is inserted into a "filament evaporator". This evaporator is fitted with three evaporation sources. The first of these, is a cup-shaped, electrically heated element, into which is placed chrome granules. The second cup is provided with copper pellets, and the third has a single gold pellet. Between these elements, and the parts to be metallized, is a set of three shutters, which allow precise control of the deposition times, and thus the thickness.

The chamber is pumped down to about $4 \times 10^{-6}$ torr. Argon is bled into the chamber via a needle valve, and the pressure allowed to stabilize at 10-20 microns. At this point, a 1200 volt field is established between the array-fixture and a "dome-like" fixture surrounding that array. As discussed above, the procedure works to clean the surface, by bombarding the surface with high-energy argon ions. The current is adjusted to about 0.85 amps, and the etch continues for 5 or more minutes.

The argon flow is shut-down, and the metallization sequence begins. The chrome is heated by passing a 100 amp current through its filament for one minute, then the current is gradually raised in steps to 250 amps. The shutter over that element is removed, allowing the chrome to evaporate onto the array-fixture. The chrome is evaporated until about 1600 angstroms is deposited. The copper is turned on, and the two metals co-evaporated until a layer of 700 angstroms of the mixture is achieved, at which point, the chrome is turned down. The copper should continue until about 5000 angstroms is deposited. Then the copper is turned off, and the gold evaporated to completion, about 1000 angstroms.

STEP 11: EVAPORATION OF SOLDER ONTO BLM PAD

The vacuum is released, and the array fixture is removed, the mask is replaced with a larger holed one, of about 5 mils diameter. This mask must be carefully aligned so that each hole is centered over a 4 mil gold-covered spot. The array-fixture is loaded into a high-power "RF-Evaporator" which has been charged with lead/tin alloy. The vacuum is created, and 4-5 mils thickness of the alloy are evaporated onto the fixture, at which point, the parts are removed from the chamber, and the mask removed.

TESTING OF CAPACITORS

The finished capacitors were tested to evaluate the bond strength resulting from attachment of the solder balls of the capacitor to a complimentaly configured series of metallized pads. More particularly, the solder balls of the finished capacitor were placed in contact with an alumina substrate having mounted thereon a series of metallized pads complimentaly spaced with respect to the solder balls of the capacitor the pads being strongly adherent to the substrate. The solder balls were subjected to heat in accordance with standard practice to induce a reflow and bonding of the balls to the metallized pads.

A metallic pin was glued to the reverse surface of the alumina substrate. The edges of the capacitor and the pin of the substrate were subjected to a separating force in a direction perpendicular to the mating faces of the substrate and capacitor and the force necessary to effect separation of the noted components was measured. In all instances, separation or cleavage was observed to occur at the interface between the surface of the capacitor and the shorting bars or at the interface between solder ball and shorting bar.

With capacitors formed in accordance with the above example, forces of 1 lb. or more were necessary to effect separation, forces of up to 1½ lbs. being experienced in many instances. As a matter of practice a separating force of about a pound is considered the minimum requirement for a capacitor of the type described.

CONTROL EXPERIMENTS

The procedures described in example 1 were carried out precisely as described therein, the sole distinction being that in step 4 the abrasive particles employed in the final polishing step were of an average 0.5 micron size. When the resultant capacitors were subjected to the pull-test described above separation occurred with an average force of from ⅛ to ½ the force necessary to effect separation of the capacitors formed in accordance with example 1. An inspection of the separated surface of the removed metallic components disclosed a substantial amount of ceramic remaining adhered to the under surface of the metal. From this observation it was concluded that while the thin film deposition step effectively attached metal to increments of the ceramic surface, the relatively low adherence of the shorting bar to the ceramic substrate as a whole was due to increments of the ceramic separating from other increments of the ceramic.

As a further control experiment, the final polishing step was effected utilizing particles of a grit size of 20 microns. More particularly, the steps 1-12 previously described was carried on precisely in accordance with example 1 the sole distinction being that the final polishing step consisted of subjecting the capacitor surface to polishing for one minute employing a grit size of 20 microns. The resultant adherence of metal to the ceramic was tested as described and it was noted that the shorting bar separated from the substrate under an average force of approximately ¼ lb., i.e. less that 50% of the force required to effect separation of capacitors processed in accordance with example 1. An examination of the under surface of the metal again showed significant adherent increments of ceramic thereon signifying that the bonding of metal to ceramic was effective at individual areas of the interface and that weakness of attachment of the metal to the ceramic was occasioned by the weakness with which increments of the ceramic are adhered to other increments of the ceramic as respects a separating force in a direction normal to the surface of the ceramic.

A further effect noted in conjunction with the use of 20 micron final polishing was the porosity of the solder ball formed as described. This porosity was attributed to the entrapment of air at the interface between the deposited metal and the solder due to the relatively rough surface of the upper face of the shorting bar. Experiments with still coarser finishing grits showed evidence of progressively more porous solder balls and a tendency of the ball to separate from the metal deposited on the capacitor.

ALTERNATE ABRADING TECHNIQUES

We have established that the specific means for abrading in accordance with step 4 hereof may be varied without materially varying the high resistance to separation above described. More particularly, the final polishing set forth in number 4 above was carried out by immersing the plate carrying the capacitors in an aqueous suspension of 5 micron grit utilizing 50 watts of ultra-sonic agitation while slowly rotating the fixture at about 1 RPM (polished surface down). After 5 minutes the platen was removed, flushed with clean water, and the capacitors de-mounted and treated in accordance with steps 4 through 12. The results of separation tests were essentially identical to the results exhibited by capacitors formed in accordance with example 1.

Substantially identical results were achieved wherein step 4 was varied to the extent that 5 micron average size grit particles were propelled in an air stream against the exposed surfaces of the capacitors.

METALLIZING CONSIDERATION

As briefly, described above, it has been found highly desirable to employ metallizing materials and thicknesses within predetermined ranges. As a preferred first or base metallizing material an alloy of titanium and tungsten (90% tungsten) is preferred, although a pure chromium metallization has been successfully employed. We have determined that if the initial coating is unduly thin, i.e. less than 1000 angstroms, it will not function to stop migration, and if the coating is unduly thick, i.e. greater than 8000 angstroms, it will not have the necessary flexibility to resist separation due to the differential thermal expansion characteristics of the metal and ceramic. We have further determined that if the metallized coating is applied over an rough ceramic surface, such as would be formed by placing the coating directly over the fired surface or the use of unduly coarse grits in the final abrading step, the resistance of the shorting bar across its length will be unacceptably high due to the fact that the effective overall length of the shorting bar resulting from the existence of peaks and valleys, will be substantially greater than where the same is formed over an essentially smooth surface. By way of example, a shorting bar formed in accordance with steps 6-9 above, placed directly over the as fired surface of the capacitor will result in a resistance four times greater than the resistance of the shorting bar over the surface polished in accordance with the invention. In addition, the roughness of a shorting bar formed directly over a fired (unpolished) ceramic results in poor contact between the solder ball and shorting contact with resultant ten-fold increase in resistance at the interface of shorting bar and solder ball.

As will be apparent, from the foregoing, there is described hereinabove a novel method for the application of a shorting bar to the exposed tabs of a ceramic capacitor. The invention hereof is largely predicated upon the discovery that unexpectedly the adhesion of a thin film vacuum deposited layer or layers on the surface of a ceramic tab type capacitor is significantly influenced by the size of the polishing medium employed in effecting the final polishing step. More particularly, the use of a finishing grit significantly above or below the critical range as defined herein results in poor adhesion of the shorting bar, while quite surprisingly the use of grits within the predetermined range significantly increases the adherence of the ceramic and shorting bar. The interrelationship of adherence and critical grit size is considered to be wholly unexpected and surprising and results in the formation of a low inductance tab type capacitor having markedly superior physical properties to capacitors of this type heretofore known. The process provides a simplified means of terminating such capacitors as contrasted with known methods which require the use of solder dams, grooves, sequential metallizing and sawing procedures and the like.

While the concept or idea of the use of vacuum deposition to effect metalizing low inductance tab type sintered ceramic capacitors has been suggested in the art cited, no commercially effective method for practicing such concept is believed to be known heretofore.

As will be apparent to those skilled in the art and made conversant with the instant disclosure, numerous variations in details of the steps hereinabove set forth may be carried out without departing from the spirit of the invention. Accordingly the invention is to be broadly construed within the scope of the appended claims.

We claim:

1. The method of termination by thin film vacuum deposition techniques of a low inductance high value tab type sintered ceramic capacitor having side by side disposed conductive tabs exiting on a first surface of said capacitor which comprises the steps of abrading said first surface of said as-sintered capacitor to form a generally smooth configuration, thereafter polishing said surface using an abrasive polishing medium having an average particle size in the range of from about 2 microns to about 10 microns, thereafter masking said surface to cover portions thereof while exposing other portions in registry with selected ones of said tabs and thereafter depositing one or more metal layers on said surface through said mask by a vacuum deposition technique.

2. The method in accordance with claim 1 wherein the combined thickness of said metal layer or layers is in the range of from about 5,000 angstroms to 40,000 angstroms.

3. The method in accordance with claim 2 wherein said metal layers comprise a first layer consisting essentially of a tungsten and titanium alloy applied directly to said surface, a second layer consisting essentially of aluminum superposed over said first layer and a third layer consisting essentially of alloy of tungsten and titanium superposed over said second layer.

4. A capacitor manufactured in accordance with the method of claim 3.

5. The method in accordance with claim 2 and including the step of bonding one or more three dimensional solder masses at selected positions on said metal layer through said mask.

6. A capacitor manufactured in accordance with the method of claim 5.

7. A capacitor manufactured in accordance with the method of claim 2.

8. A capacitor manufactured in accordance with the method of claim 1.

* * * * *